No. 770,619. PATENTED SEPT. 20, 1904.
F. E. WALLER.
CORN HUSKING DEVICE.
APPLICATION FILED MAR. 30, 1904.

NO MODEL.

WITNESSES.
E. B. Gilchrist
J. B. Hull.

INVENTOR.
Frank E. Waller,
By his Attorneys,
Thurston & Bates.

No. 770,619. Patented September 20, 1904.

UNITED STATES PATENT OFFICE.

FRANK E. WALLER, OF MACOMB, ILLINOIS, ASSIGNOR OF ONE-HALF TO WILLIAM H. NEECE, OF MACOMB, ILLINOIS.

CORN-HUSKING DEVICE.

SPECIFICATION forming part of Letters Patent No. 770,619, dated September 20, 1904.

Application filed March 30, 1904. Serial No. 200,732. (No model.)

*To all whom it may concern:*

Be it known that I, FRANK E. WALLER, a citizen of the United States, residing at Macomb, in the county of McDonough and State of Illinois, have invented a certain new and useful Improvement in Corn-Husking Devices, of which the following is a full, clear, and exact description, reference being had to the accompanying drawings.

My invention relates to corn-husking devices, and has for its object the provision of a device of this character that will permit the stripping and removal of the husk without tearing the grains of corn from the cob or becoming fastened in the ear of corn, that will effectively protect the palm, wrist, and forearm of the operator, that will brace the wrist and forearm of the operator during the act of breaking the ear from the stalk, and that will firmly support the hook or husk-penetrating device.

The invention may be defined generally as consisting in the combinations of elements set forth in the claims hereto appended.

Figure 1:
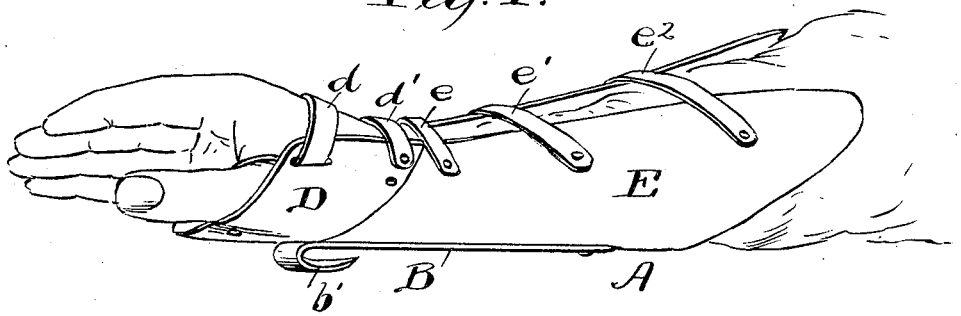
Figure 2:
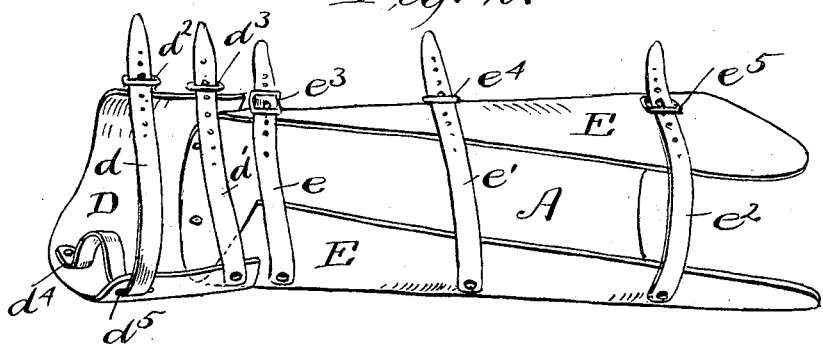
Figure 3:
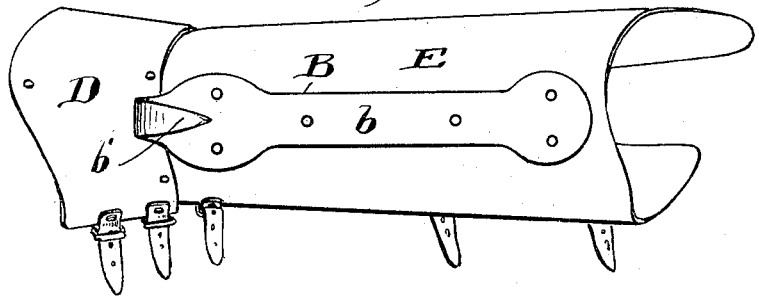
Figure 4:
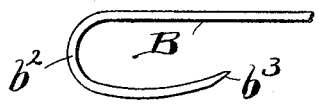

Referring to the drawings, Figure 1 shows my corn-husking device, in side elevation, applied to the hand, wrist, and forearm of the operator. Fig. 2 represents a top plan view of said device. Fig. 3 represents a bottom plan view of the same. Fig. 4 represents an enlarged side elevation of the hook.

Describing the parts by letters, A represents the device as a whole, the same consisting of three members—namely, a hook member B, a glove or palm-protecting member D, and a wrist and forearm protecting member E.

The hook consists of a long base-plate $b$, which is suitably secured, as by rivets, to the member E. The hook proper, $b'$, is V-shaped in plan and is formed with a round bend $b^2$, the point of the hook $b^3$ being inclined or recurved toward the base-plate and being preferably beveled from the lower portion thereof toward said plate, whereby the point of the hook is within the outer extreme of the curvature, so that in operation the hook may enter the husk on one side of the ear, pass between the husk and the grains of corn and around to the other side of the ear, removing the husk and exposing the ear in position to be readily grasped by the hand of the operator.

The member D, which protects the palm of the hand from injury by the ear of corn, is preferably of soft pliable leather. It extends to the wrist of the operator and is there secured, as by rivets, to the member E, which protects and braces the wrist and forearm of the operator. The member D is open at the upper portion thereof, as shown in Figs. 1 and 2, straps $d\ d'$ extending from one edge of said member to the other across the back of the hand of the operator, suitable buckles $d^2\ d^3$ being provided at the other edge of said member for said straps. One of these straps, as $d$, is not secured to the edge of the member D, but to the body of said member, near the front end thereof, and between the line of the longitudinal axis of the hook and the edge. A slit $d^5$ is provided near the edge of the member D, through which slit the strap $d$ extends. There is thus formed between the portion of the strap included between its end $d^4$ and the slit $d^5$ and the body of the member D subjacent thereto a bight or loop for the reception of the thumb of the operator, as shown in Figs. 1 and 2. With the device in position and the thumb inserted between the strap and the body of the member $d$ therebelow the strap $d'$ extends across the lower portion of the back of the hand adjacent to the wrist.

The member E, which is preferably of stiff leather, is provided with several straps, three such straps $e\ e'\ e^2$ being shown. These straps are suitably secured, as by riveting, near one edge of the member E and extend across the space between the edges of said member, buckles $e^3\ e^4\ e^5$ for said straps being provided on the other edge of the member. Of these straps the strap $e$ is secured to the member E adjacent to the junction therewith of the member D and in position to extend across the top of the wrist of the operator, thereby bracing the same during the operation of breaking the ear from the stalk.

In operation the arm of the operator to which the husking device is attached is drawn across the ear about the middle of the same. The point of the hook penetrates the husk and owing to its peculiar construction slides around the ear between the grains and the husk, completely removing all the husk on that side of the ear without mutilating the kernels. This movement exposes the ear in position to be readily grasped with the fingers, and the operation of stripping the husk, grasping the ear, and breaking the same from the cob may all be done with one stroke of the arm. The flexibility of the palm-protecting member permits sufficient movement of the hand to enable the ear to be readily grasped.

The length of the member E possesses a number of advantages, among which are the complete protection of the sleeve and forearm of the operator from injury by the husk and fodder, permitting the employment of a long base for the hook and preventing the tilting of the rear portion of said base-plate and the consequent ineffective operation of the hook to penetrate the husk, and the distribution of the pulling force to the entire forearm instead of to the wrist alone. In combination with the long base-plate of the hook it braces the wrist and enables the operator to more readily break the ear from the stalk and permits the employment of a plurality of straps so located that the pull exerted in splitting the husk may be distributed uniformly to both members D and E without the necessity of drawing the straps uncomfortably tight. The long base-plate of the hook extending substantially the length of the member E preserves the length of said member and prevents it from wrinkling and becoming uncomfortable to the wrist and arm of the operator. The hand is free, excepting the soft pliable leather member D (which protects the palm of the hand) and the strap which embraces the thumb. This strap prevents the device from working around on the arm and wrist, making it impossible for the hook to get out of operative position.

From the foregoing description it will be apparent that I have produced a corn-husking device which is simple and comparatively inexpensive, which will enable the operator to conveniently and speedily husk the corn, will protect the hand, wrist, and forearm of the operator from injury, at the same time serving as a brace for these members, and will permit the husk to be split without mutilating the corn.

What I claim as my invention, and desire to secure by Letters Patent, is—

1. In a corn-husking device, the combination of a sleeve or protecting member which extends substantially the full length of the forearm of the operator, and a hook attached to said sleeve or protecting member, said hook having a base-plate extending substantially the length of said sleeve or member and secured thereto to form a stay or brace therefor, substantially as described.

2. In a corn-husking device, the combination of a sleeve or protecting member for the forearm of the operator, a flexible protecting or glove member for the hand of the operator secured to the first-mentioned member, and a hook secured to said arm-protecting member with its hook portion proper adjacent to the junction of said members, substantially as described.

3. In a husking device, the combination of a long sleeve or protecting member for the arm and wrist of the operator, a glove or palm-protecting member secured to said sleeve member, and a hook secured to said sleeve member, said hook having a base portion extending substantially the length of the sleeve member and a hook portion adjacent to the junction of the glove and sleeve members, substantially as described.

4. In a husking device, the combination of a sleeve member, and a recurved hook secured to the under side of said member, said hook having a point inclined toward the base of the hook, substantially as described.

5. In a husking device, the combination of a sleeve member, a pointed hook secured to said member, said hook being recurved to bring its point within the outer extreme of the curvature, substantially as described.

6. In a corn-husking device, the combination of a sleeve or protector of substantially the length of the forearm, a hook having a shank or base-plate extending substantially the length of said sleeve and rigidly secured thereto near its extremities, and means for securing said sleeve to the forearm throughout substantially its entire length, whereby said shank is enabled to act as a stiffener or brace for the wrist and forearm of the operator, substantially as described.

7. In a corn-husking device, the combination of an elongated sleeve member of stiff leather, a palm-protecting member of pliable leather secured to said sleeve member, and a hook having an elongated base-plate secured to said sleeve member, the point of the hook being adjacent to the forward extremity of the sleeve member, substantially as described.

8. In a corn-husking device, the combination of a palm-protecting member and a sleeve member, said members being suitably connected, a strap secured to the inner forward end of the palm-protecting member and extending through a portion of said member adjacent to the edge thereof to form a loop therewith for the reception of the thumb of the operator, a hook secured to the arm-protecting member, and additional straps for said members, substantially as described.

9. A corn-husking device, consisting of a long arm and wrist supporting and protecting member made of leather or similar material and adapted to inclose the lower portion of the arm and wrist of the operator, a flexible palm-protecting member adapted to embrace the palm of the operator, straps for connecting opposite edges of said members, and a hook secured to the front end of said first-mentioned member, substantially as described.

10. A corn-husking device, consisting of a long arm and wrist supporting and protecting member of stiff leather or similar material adapted to inclose the lower portion of the arm and wrist of the operator, a palm-protecting member of soft leather or similar material adapted to embrace the palm of the operator, straps for connecting opposite edges of said members, one of said straps extending across the wrist of the operator, and a hook attached to said first-mentioned member, substantially as described.

11. A corn-husking device, consisting of an arm and wrist supporting and protecting member of leather or similar material adapted to inclose the lower portion of the arm and wrist of the operator, a flexible palm-protecting member secured to said first-mentioned member and adapted to embrace the palm of the operator, a strap secured to the lower portion of said palm-protecting member and adjustably connected to said member near an edge thereof to form, with said member, a bight or loop for the reception of the thumb of the operator, a buckle at the opposite edge of said member for said strap, additional straps and buckles for both of said members, and a hook secured to the lower portion of said first-mentioned member, substantially as described.

12. A husking device, comprising a long arm and wrist supporting and protecting member of leather or similar material adapted to inclose the lower portion of the arm and wrist of the operator and extending substantially the length of the forearm of the operator, straps for connecting opposite edges of said member, one of said straps being in position to embrace the wrist of the operator, a hook secured to the front end of said member, said hook having an elongated base to extend substantially the length of said member and rigidly secured to such member near its extremities, substantially as described.

13. A corn-husking device, comprising a glove or palm-protecting member open at the front and top, a strap secured to the lower portion of said member and adjustably connected to said member near an edge thereof to form with said member a bight or loop for the reception of the thumb of the operator, a buckle for said strap at the opposite edge of said member, and a hook carried by said device, substantially as described.

14. A corn-husking device comprising, in combination, a long wrist and arm protecting member, a hook having a base-plate extending nearly the length of said former member and secured thereto, the point of the hook being recurved toward said base-plate, substantially as described.

In testimony whereof I hereunto affix my signature in the presence of two witnesses.

FRANK E. WALLER.

Witnesses:
  J. B. HOLMES,
  S. F. RUSSELL.